S. ASATURIAN.
ANIMAL FEED RECEPTACLE.
APPLICATION FILED MAY 29, 1920. RENEWED NOV. 26, 1921.

1,421,142. Patented June 27, 1922.

UNITED STATES PATENT OFFICE.

SETRAK ASATURIAN, OF NEW YORK, N. Y.

ANIMAL FEED RECEPTACLE.

1,421,142. Specification of Letters Patent. Patented June 27, 1922.

Application filed May 29, 1920, Serial No. 385,094. Renewed November 26, 1921. Serial No. 518,072.

*To all whom it may concern:*

Be it known that I, SETRAK ASATURIAN, a citizen of the United States, residing at New York, in the county and State of New York, have invented certain new and useful Improvements in Animal Feed Receptacles, of which the following is a full, clear, and exact specification.

This invention relates to feed receptacles for animals, and is in the nature of a feed bag.

The object of the invention is to provide an improved receptacle for holding feed for animals, such as horses and mules, said receptacle having means for automatically raising the feed in the same as it is eaten, thus saving waste or loss of part of the feed which is occasioned by the animal tossing up the old type of feed bag to get the grains in the bottom thereof. Another object is to provide a feed holder adapted to be removably placed in a bucket or other suitable receptacle whereby the advantages of the automatic feed raiser is obtained and at the same time the outer receptacle may be used separately for watering the animals or other purposes. Further objects will appear as the description proceeds.

The invention will be first hereinafter described in connection with the accompanying drawings, which constitute part of this specification, and then more specifically defined in the claim at the end of the description.

In the accompanying drawings, wherein similar reference characters are used to designate corresponding parts throughout the several views:—

Figure 1:
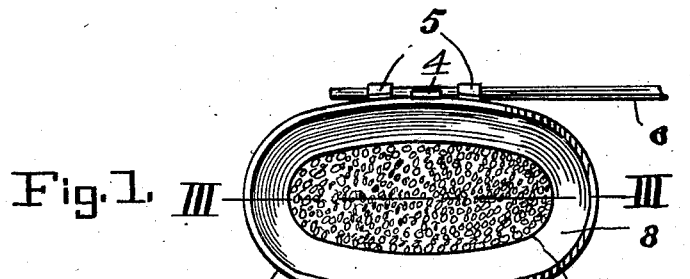
Figure 1 is a plan view of a feed receptacle made substantially in accordance with this invention.
Figure 2:
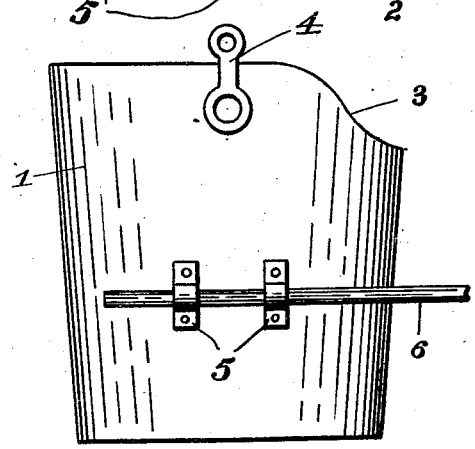
Figure 2 is a side elevation thereof.

The outer receptacle 1 shown in the drawings is in the form of a bucket but is specially shaped generally oval in cross section to fit around the feed holder 2, and has its upper edge cut away at 3 at one end to fit under the animal's throat. It will be understood, however, that an ordinary bucket may also be used with the feed holder if desired, and that the receptacle 1 shown may be used as a bucket for watering the animal when the feed holder is removed therefrom. Said receptacle is provided with bucket ears 4 of any suitable form to which a rope (not shown) may be attached for attaching the device to the animal's head and also to serve as a handle or bail for carrying. The receptacle is also provided with pairs of loops or straps 5 secured to its sides in any suitable manner for receiving the ends of shafts 6 for supporting the device below the animal's head. Any other suitable means may be employed for supporting the receptacle in proper position for use.

The feed holder 2 is preferably made oval in cross section to generally conform to the shape of the animal's muzzle, but this shape may be varied if desired without departing from this invention. Said feed holder comprises a straight walled tubular member 7 having a dished flange 8 at its upper edge to fit the mouth of the outer receptacle 1, a vertically movable feed support 9 fitted in said tubular member 7, a removable end plate 10 having a flange 11 at its edge fitting in the lower end of the member 7, and a helical spring 12 interposed between said end plate and feed support.

Figure 3:
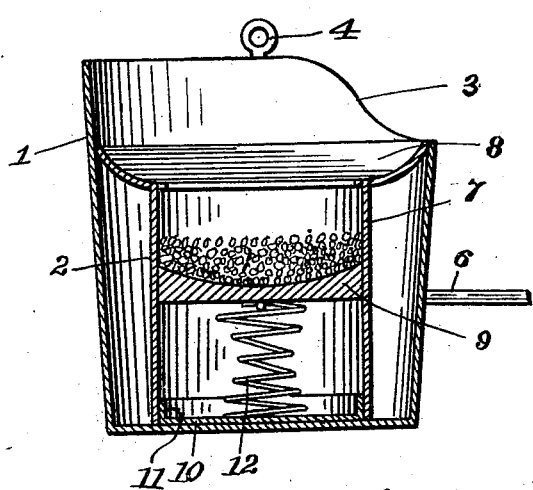
Figure 3 is a section on the line III—III of Figure 1.

The spring is tensioned to normally support the feed holder or support 9 near the upper end of the member 7 and to counterbalance a feeding of oats or other grain so that the surface of said feed will always be arranged near the upper end of said member, the support and remaining grain being automatically raised as the upper layers of said grain is eaten off. The upper surface of said support 9 is preferably dished, as shown in Figure 3, to avoid any tendency of the grain to work down between the edge of said support and the walls of the member 7. The dished flange 8 at the upper edge of said member 7 serves to return to said member any grain that may drop from the animal's mouth while he is eating.

Having thus described my invention, what I claim as new and desire to secure by Letters Patent of the United States is:—

The combination with an outer receptacle adapted to hold water, of a feed holder removably mounted in said receptacle, a constant level feed elevating device arranged in said feed holder and removable from the receptacle therewith, and a converging flange carried by said feed holder and extending from the upper edge thereof to the walls of the receptacle for the purpose specified.

In testimony whereof I have signed my name to this specification.

SETRAK ASATURIAN.